United States Patent
Fan et al.

(10) Patent No.: US 6,532,524 B1
(45) Date of Patent: Mar. 11, 2003

(54) PORT PRIORITIZATION SCHEME

(75) Inventors: Junfei Fan, Mississippi State, MS (US); Jeffery Scott Hunt, Ackerman, MS (US)

(73) Assignee: Cypress Semiconductor Corp., San Jose, CA (US)

(*) Notice: Subject to any disclaimer, the term of this patent is extended or adjusted under 35 U.S.C. 154(b) by 0 days.

(21) Appl. No.: 09/538,822

(22) Filed: Mar. 30, 2000

(51) Int. Cl.[7] .............................................. G06F 12/14
(52) U.S. Cl. ..................... 711/168; 711/163; 711/173; 711/131; 711/150
(58) Field of Search ........................ 711/131, 149, 711/141, 144, 145, 146, 123, 140, 163, 168, 170, 173; 365/230.05, 189.07

(56) References Cited

U.S. PATENT DOCUMENTS

| | | | | |
|---|---|---|---|---|
| 4,493,033 A | * | 1/1985 | Ziegler et al. | 711/131 |
| 5,329,630 A | * | 7/1994 | Baldwin | 711/149 |
| 5,497,470 A | * | 3/1996 | Liencres | 711/140 |
| 5,680,542 A | * | 10/1997 | Mulchandani et al. | 714/28 |
| 5,752,260 A | * | 5/1998 | Liu | 711/118 |
| 5,956,748 A | * | 9/1999 | New | 365/230.05 |
| 6,125,421 A | * | 9/2000 | Roy | 711/149 |
| 6,345,335 B1 | * | 2/2002 | Flynn | 711/123 |

OTHER PUBLICATIONS

Alves et al., "Built–In Self–Test for Multi–port RAMs", © 1991, IEEE, p. 248–251.*
Crawford et al., "Cache Coherence in a Multiport Memory Environment", © 1994 IEEE, p. 632–642.*

* cited by examiner

*Primary Examiner*—Do Hyun Yoo
*Assistant Examiner*—Brian Peugh
(74) *Attorney, Agent, or Firm*—Christopher P. Maiorana, P.C

(57) ABSTRACT

An apparatus comprising a first compare circuit, a second compare circuit and a memory. The first compare circuit may be configured to present a first match signal in response to a first address and a second address. The second compare circuit may be configured to present a second match signal in response to the first match signal, a first write enable signal and a second write enable signal. The memory may also be configured to present the first and second write enable signals. In one example, the memory may be configured to store and retrieve data with zero waiting cycles in response to the second match signal.

19 Claims, 2 Drawing Sheets

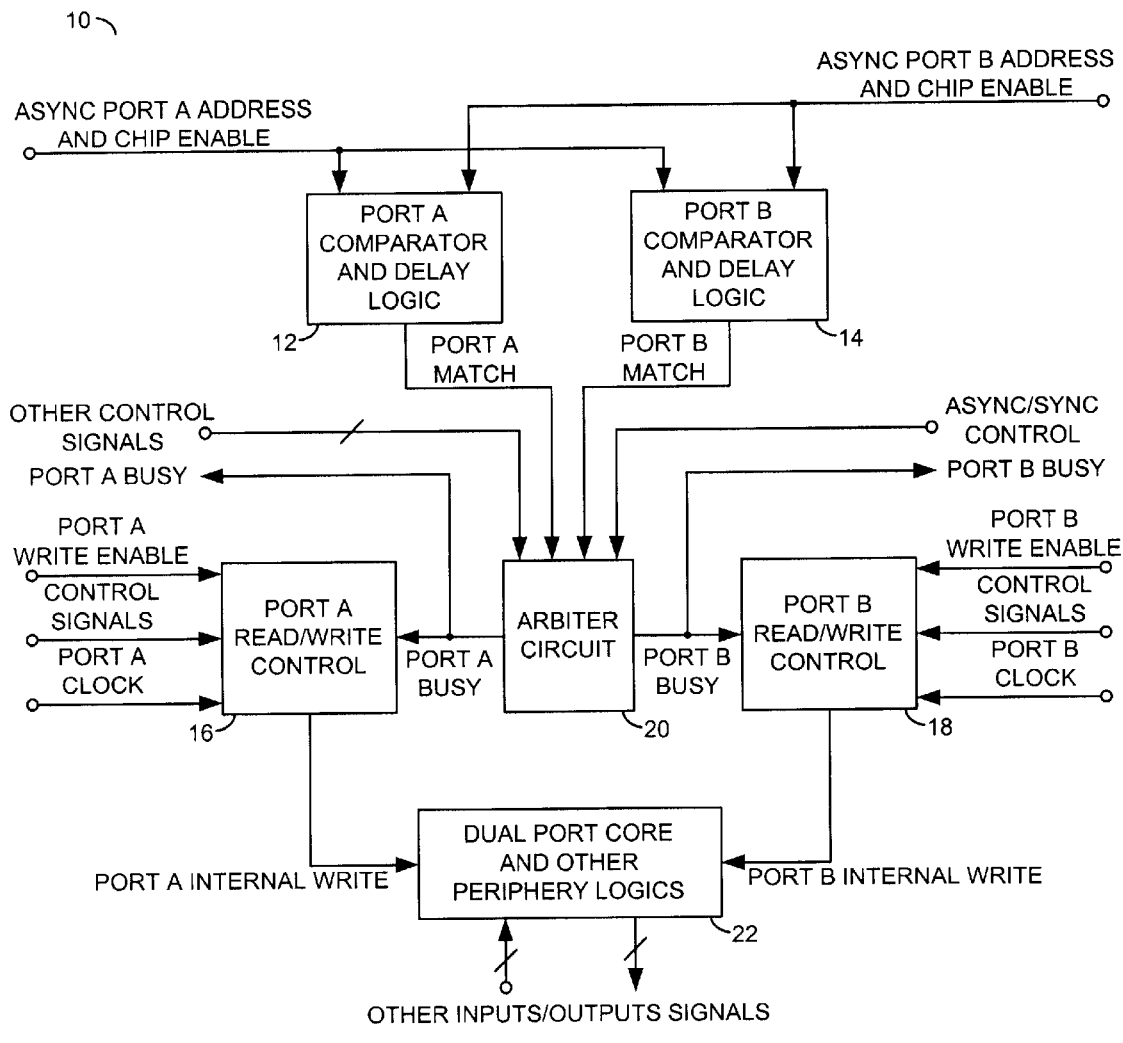
(CONVENTIONAL)
FIG. 1

PORT PRIORITIZATION SCHEME

FIELD OF THE INVENTION

The present invention relates to dual port memories generally and, more particularly, to a method and/or architecture for port prioritization in dual port memories.

BACKGROUND OF THE INVENTION

Referring to FIG. 1, a conventional asynchronous dual port memory 10 is shown. The dual port memory 10 generally comprises a comparator 12, a comparator 14, a read/write control block (or circuit) 16, a read/write control block (or circuit) 18, an arbiter circuit 20 and a core 22.

In previous asynchronous designs, a complex arbitration scheme is used to eliminate memory cell crow bar current when both ports are attempting to write into the same memory cell location of the core 22 with opposite data (contention write). In previous synchronous dual port designs, potential memory cell crow bar current is not eliminated. Such a scenario increases current consumption (ICC) of the memory 10. A conventional asynchronous dual port allows either port to take control of the memory when both ports are trying to store or retrieve data from the same memory location. The arbitration circuit assigns priority by selecting the port which is the first to request a memory access.

Conventional approaches for eliminating memory cell crow bar current have been implemented for asynchronous dual port designs by using arbitration schemes. Asynchronous dual port arbitration schemes require complex logic to determine port priority. Because arbitration logic is not implemented for conventional synchronous dual port designs, memory cell crow bar current is not eliminated. Memory cell crow bar current increases current consumption for synchronous dual port memories.

It may be desirable to provide a method to eliminate crow bar current and reduce ICC for synchronous dual port designs during a write access contention mode. It may also be desirable to provide a method for eliminating crow bar current in asynchronous dual port designs without requiring complex arbitration circuitry.

SUMMARY OF THE INVENTION

The present invention concerns an apparatus comprising a first compare circuit, a second compare circuit and a memory. The first compare circuit may be configured to present a first match signal in response to a first address and a second address. The second compare circuit may be configured to present a second match signal in response to the first match signal, a first write enable signal and a second write enable signal. The memory may also be configured to present the first and second write enable signals. In one example, the memory may be configured to store and retrieve data with zero waiting cycles in response to the second match signal.

The objects, features and advantages of the present invention include providing a method and/or architecture that may (i) eliminate memory cell crow bar current without requiring complex arbitration circuitry, (ii) allow a prioritization scheme that may be implemented in either synchronous or asynchronous dual port memories, (iii) allow a high priority port to store or retrieve data at any memory location with zero waiting cycles, (iv) provide an address match signal if a user desires external arbitration to be implemented, (v) reduce user-defined arbitration logic, (vi) ensure a memory contains valid data during a write access contention mode without requiring additional arbitration circuitry, (vii) allow a user to select the high priority port which always obtains access to the memory, and/or (viii) allow write access to the high priority port, which may prevent unexpected data being written into the memory during the write contention mode.

BRIEF DESCRIPTION OF THE DRAWINGS

These and other objects, features and advantages of the present invention will be apparent from the following detailed description and the appended claims and drawings in which:

FIG. 1 is a block diagram of a conventional arbitration scheme; and

DETAILED DESCRIPTION OF THE PREFERRED EMBODIMENTS

Figure 2:
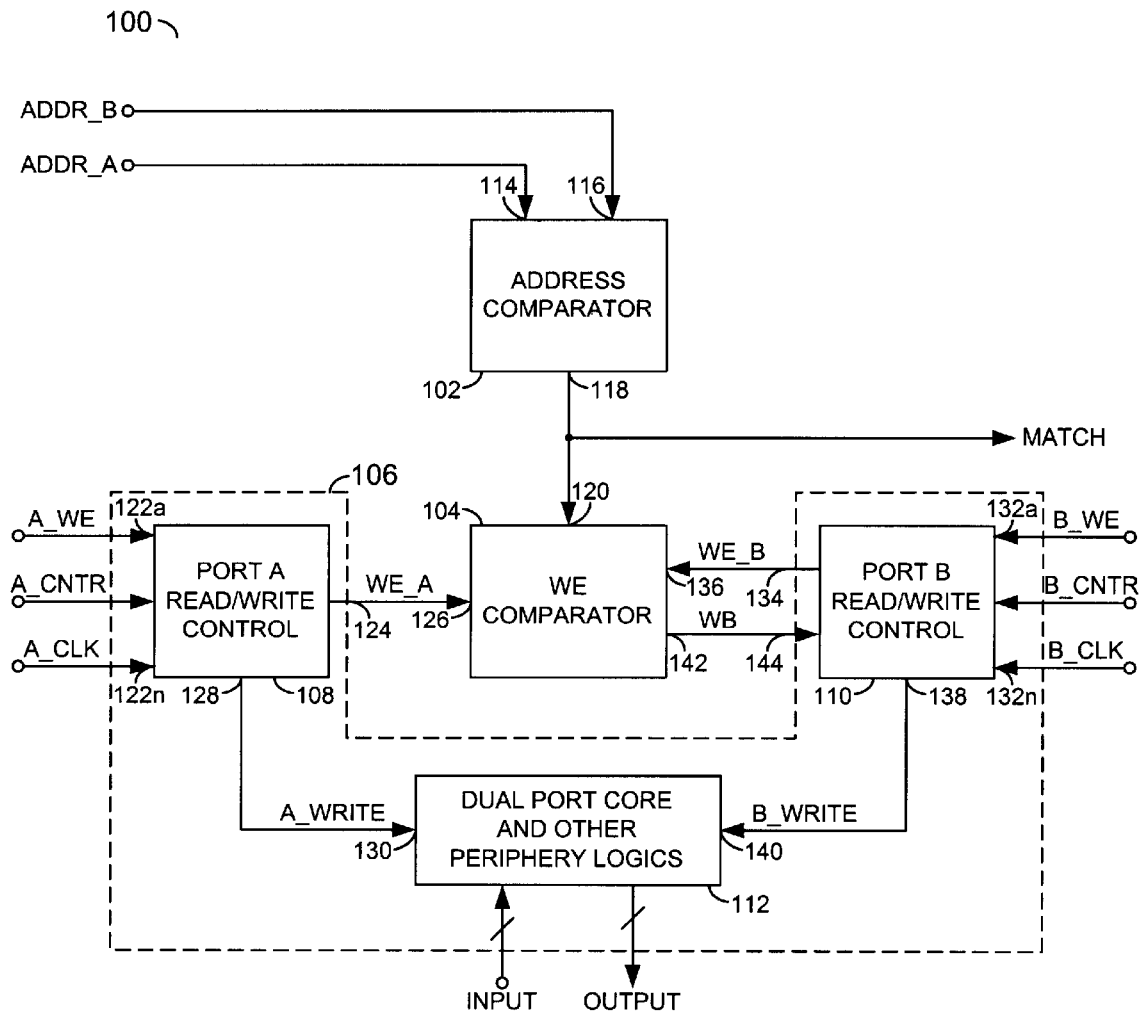
FIG. 2 is a block diagram of a preferred embodiment of the present invention.

Referring to FIG. 2, a block diagram of a circuit 100 is shown in accordance with a preferred embodiment of the present invention. The circuit 100 may provide a method and/or architecture that may eliminate crow bar current and reduce current consumption (ICC) during a dual port write access contention mode. A dual port prioritization scheme of the circuit 100 may eliminate write access contention and allow a high priority port to store and retrieve data with zero waiting cycles.

The circuit 100 generally comprises an address comparator block (or circuit) 102, a write enable comparator block (or circuit) 104 and a memory block (or circuit) 106. The memory circuit 106 generally comprises a read/write control block (or circuit) 108, a read/write control block (or circuit) 110 and a dual port core 112. The memory circuit 106 may be implemented as a synchronous or asynchronous memory. The memory circuit 106 may also comprise other peripheral logic required to read and write information to the dual port core 112. The read/write control circuit 108 may be connected to a first port (e.g., port A). The read/write control block 110 may be connected to a second port (e.g., port B).

The address compare circuit 102 may have an input 114 that may receive an address (e.g., ADDR_A) and an input 116 that may receive an address (e.g., ADDR_B). The compare circuit 102 may have an output 118 that may present a signal (e.g., MATCH) in response to the address ADDR_A and the address ADDR_B. The signal MATCH may be implemented, in one example, as an address match signal which may be presented (i) to an input 120 of the write enable comparator circuit 104 and/or (ii) as an output signal of the circuit 100. Additionally, the signal MATCH may be implemented as any other appropriate signal in order to meet the criteria of a particular implementation. For example, the signal MATCH may be used to implement external arbitration (e.g., as an external output).

The read/write control circuit 108 may have a number of inputs 122a–122n, where n is an integer. The inputs 122a–122n may receive a number of signals (e.g., A_WE, A_CNTR and A_CLK). The read/write control circuit 108 may have an output 124 that may present an enable signal (e.g., WE_A) to an input 126 of the write enable comparator circuit 104. Additionally, the read/write control circuit 108 may have an output 128 that may present a write signal (e.g., A_WRITE) to an input 130 of the core 112.

The read/write control circuit 110 may have a number of inputs 132a–132n, where n is an integer. The inputs 132a–132n may receive a number of signals (e.g., B_WE, B_CNTR and B_CLK). The read/write control circuit 110 may have an output 134 that may present an enable signal (e.g., WE_B) to an input 136 of the write enable comparator circuit 104. Additionally, the read/write control circuit 110 may have an output 138 that may present a write signal (e.g., B_WRITE) to an input 140 of the core 112. Furthermore, the write enable comparator circuit 104 may have an output 142 that may present a signal (e.g., WB) to an input 144 of the read/write control circuit 110. In one example, the signal WB may be implemented as a write block signal. In another example, the signal WB may be implemented as a match signal that indicates a write contention operation. However, the signal WB may be implemented as other appropriate signals in order to meet the criteria of a particular implementation.

The circuit 100 may be implemented as a dual port prioritization scheme that may be implemented in both synchronous and asynchronous dual port memory designs. The circuit 100 may prevent memory cell crow bar current when both the port A and the port 2 are attempting to write into the same memory cell location with opposite data. The circuit 100 may be implemented to resolve dual port write access contention. The circuit 100 may allow the high priority port to store and retrieve data with zero waiting cycles.

A write operation of a low priority port may be disabled during the write access contention mode (via the signal WB). Prioritization of the circuit 100 may only need to be activated address ADDR_B are the same. The prioritization scheme of the circuit 100 may be implemented for either asynchronous or synchronous dual port memories. The prioritization scheme of the circuit 100 may prevent both the port A and the port B from simultaneously writing into the same memory cell location, which may eliminate (or reduce) memory cell crow bar current. For example, the port A may be the priority port and may be given write priority (during a simultaneous write condition), while the port B may be disabled. However, the particular port given priority may be varied to meet the design criteria of a particular implementation. For example, the port B may be given write priority (during a simultaneous write condition), while the port A may be disabled. Regardless of the priority between the port A and the port B, the circuit 100 may ensure that both the port A and the port B are not allowed to write opposite data into the same memory cell during the write contention mode. The circuit 100 may block the write to the low priority port, which may eliminate(or reduce) memory cell crow bar current. A similar prioritization scheme may be implemented for either synchronous or asynchronous dual port memories.

The address match signal MATCH may be generated when an address match occurs. The signal MATCH may be accessible to a user desiring external arbitration logic. Also, by providing the signal MATCH externally, the user requires less arbitration external to the memory 106. However, the circuit 100 may not require arbitration circuitry to ensure the core 112 contains valid data during the write access contention mode. The circuit 100 may allow write access to the high priority port, preventing unexpected data from being written into the core 112.

The match (write block) signal WB may depend on the signal MATCH, the signal WE_A and the signal WE_B of the circuit 100. For example, anytime the address ADDR_A and the address ADDR_B are the same and both ports are requesting a write operation to be performed, the match (write block) signal WB may be activated to disable the low priority port from writing to the dual port core 112.

The port prioritization scheme of the circuit 100 may be highly valuable in embedded synchronous and asynchronous dual port memory or dual port SRAM designs. The circuit 100 may be implemented for both asynchronous dual port memories and synchronous dual port memories. The circuit 100 may prevent potential crow bar conditions during contention dual port write operations, therefore eliminating (or reducing) crow bar current and reducing the total memory current consumption. The circuit 100 may allow the high priority port to store and retrieve data with zero waiting cycles.

While the invention has been particularly shown and described with reference to the preferred embodiments thereof, it will be understood by those skilled in the art that various changes in form and details may be made without departing from the spirit and scope of the invention. For example, the present invention may be implemented for both synchronous and asynchronous multi-port (e.g., quad port or higher) memories.

What is claimed is:

1. An apparatus comprising:
   a first compare circuit configured to present a first match signal in response to a first address and a second address;
   a second compare circuit configured to present a second match signal in response to said first match signal, a first write enable signal and a second write enable signal; and
   a memory configured to (i) store and retrieve data in response to said second match signal and (ii) present said first and second write enable signals, wherein (a) said memory comprises (i) a first read/write control circuit, (ii) a second read/write control circuit, and (iii) a core configured to read and write data and (b) said first read/write control circuit is configured to control a first portion of said core and said second read/write control circuit is configured to control a second portion of said is core.

2. The apparatus according to claim 1, wherein said first compare circuit comprises an address compare circuit.

3. The apparatus according to claim 1, wherein said second compare circuit comprises a write enable compare circuit.

4. The apparatus according to claim 1, wherein said first match signal comprises an address match signal.

5. The apparatus according to claim 1, wherein said second match signal comprises a write block signal.

6. The apparatus according to claim 1, wherein said memory is further configured to prevent a write to a portion of said core in response to said second match signal.

7. The apparatus according to claim 1, wherein said second compare circuit is configured to assign a high priority to said first read/write control circuit and assign a low priority to said second read/write control circuit when both read/write control circuits are attempting to write to the same memory cell location.

8. The apparatus according to claim 1, wherein said first read/write control circuit is configured in response to one or more first signals.

9. The apparatus according to claim 8, wherein said second read/write control circuit is configured in response to one or more second signals.

10. The apparatus according to claim 9, wherein (i) one or more of said first and second signals comprises a clock signal, (ii) one or more of said first and second signals comprise a write enable signal, and (iii) one or more of said first and second signals comprise a control signal.

11. The apparatus according to claim 1, wherein said core comprises an asynchronous dual port memory.

12. The apparatus according to claim 1, wherein said core comprises a synchronous dual port memory.

13. An apparatus comprising:

means for presenting a first match signal in response to a first address and a second address;

means for presenting a second match signal in response to said first match signal, a first write enable signal and a second write enable signal; and means for (i) storing and retrieving data in response to said second match signal and (ii) presenting said first and second write enable signals, wherein (a) said means for storing and retrieving comprises (i) a first read/write control circuit, (ii) a second read/write control circuit, and (iii) a core configured to read and write data and (b) said first read/write control circuit is configured to control a first portion of said core and said second read/write control circuit is configured to control a second portion of said core.

14. A method for writing to a memory, comprising the steps of:

(A) generating a first match signal in response to a first address and a second address;

(B) generating a second match signal in response to said first match signal, a first write enable signal and a second write enable signal; and (C) storing and retrieving data in response to said second match signal, wherein (a) step (C) stores and retrieves said data using (i) a first read/write control circuit, (ii) a second read/write control circuit, and (iii) a core configured to read and write data and (b) said first read/write control circuit is configured to control a first portion of said core and said second read/write control circuit is configured to control a second is portion of said core.

15. The method according to claim 14, wherein said method comprises storing and retrieving data to and from an asynchronous dual port memory.

16. The method according to claim 14, wherein said method comprises storing and retrieving data to and from a synchronous dual port memory.

17. The method according to claim 14, wherein said method comprises storing and retrieving data to and from an asynchronous multi-port memory.

18. The method according to claim 14, wherein said method comprises storing and retrieving data to and from a synchronous multi-port memory.

19. The method according to claim 14, wherein said method further comprises writing to said memory with zero wait cycles.

* * * * *